Patented Apr. 7, 1953

2,634,303

UNITED STATES PATENT OFFICE 2,634,303

STORAGE BATTERY

Joseph Donald Moulton, West Orange, N. J., assignor to Thomas A. Edison, Incorporated, West Orange, N. J., a corporation of New Jersey No Drawing. Application February 2, 1949, Serial No. 74,259

11 Claims. (Cl. 136—6)

This invention relates to improvements in storage batteries which employ an alkaline electrolyte, and particularly the invention relates to such batteries of the type which have negative and positive electrodes respectively employing cadmium and an oxide of nickel or cobalt as the active materials.

It is an object of my invention to provide improvements in such batteries which will markedly increase their discharge capacity, particularly at extremely cold temperatures.

Another object is to provide improved such batteries having improved low-temperature performance when discharged at high rates.

A further object is to provide batteries of the type mentioned which are capable of delivering very high currents for appreciable periods of time at temperatures below 0° F. and which otherwise have at least normal operating characteristics.

A further object is to provide improvements in such batteries which will enable them to be discharged again and again at extremely cold temperatures at as much as ten times normal discharge rate while maintaining an ampere-hour discharge capacity which is at least as much as 25% of the normal capacity of the batteries when operated at normal temperatures.

Another object is to provide an economical and improved storage battery of the type mentioned which will have increased capacity when discharged at a high rate and at low temperatures, and particularly it is an object in this respect to provide a battery which will deliver a given ampere hours at a higher current density at the electrodes at low temperatures than has been heretofore obtainable.

A still further object is to obtain an improved discharge capacity at low temperatures, and other improved operating characteristics, in batteries of the type mentioned by the simple and economical expedient of incorporating an electrolytically-active material into the electrolyte and/or one or more of the electrodes of the battery.

These and other objects and features of the invention are realized preferably by incorporating tin or compounds thereof, hereinafter generally referred to as tin materials, into the alkaline electrolyte and/or the negative cadmium electrode, as is hereinafter fully described.

It is known from U. S. Patent No. 1,299,693 to Thomas A. Edison that the addition of a relatively large amount of tin to the iron electrode of a nickel-iron-alkaline storage battery will increase the normal capacity of such a battery. I have found however that the addition of a relatively small amount of tin to a nickel-cadmium-alkaline storage battery has a selective benefit in that it markedly increases the capacity of the battery when discharged at high rates and at cold temperatures but does not substantially affect the operation of the battery at normal temperatures.

Each electrode of a battery of the type mentioned may comprise a conducting support which may be apertured, pocketed or finely porous to receive the respective active material. Preferably, a porous support is used and is produced as follows: A grid structure of iron is first suitably nickel plated so as to be unaffected by the alkaline solution. A layer of metallic nickel powder is next placed on each side of the grid structure, and retained thereon by suitable frame plates, and is then sintered by heating the same in an atmosphere as of hydrogen or nitrogen until the metallic particles integrate to produce an integral porous metal support. One such support is filled with cadmium, as active material, to form a negative electrode, by impregnating it with a suitable cadmium salt, say cadmium chloride or cadmium nitrate, and then cathodically electrolyzing it in an alkaline electrolyte of say potassium hydroxide to reduce the salt to a finely-divided metallic cadmium. Another such support is filled with nickel oxide, as active material, to form a positive electrode, by impregnating it with a suitable nickel salt, say nickel chloride or nickel nitrate, and then anodically electrolyzing it in an alkaline electrolyte of say potassium hydroxide to convert the nickel salt into finely-divided nickel oxide within and through the pores of the support. These impregnating operations are well understood in the art and need not be herein more fully described. However, it is to be understood that for the purposes of the present invention a pocketed support or grid may be used instead of a porous support, as described, although not as advantageously, and such a support may be filled with active material in any suitable way known in the alkaline-storage-battery field.

When a positive electrode including finely-divided nickel oxide is placed in an alkaline solution, say of potassium and lithium hydroxides, and is then charged, the nickel is raised to a higher state of oxidation. When such a charged nickel-oxide electrode is discharge with a negative electrode including cadmium as the active material, the nickel oxide is reduced to a lower state of oxidation and the metallic cadmium is oxidized. These reactions take place without substantially changing the electrolyte, since the active materials and their oxides are insoluble in the electrolyte solution and the solution serves merely as an ionic conductor of the current. Accordingly, these batteries are characterized as being long-lived and having minimum service requirements. Also, they may be charged and discharged at widely different current rates, and may be overcharged, without undergoing appreciable deterioration.

Although these batteries have good service characteristics at normal temperatures, the ampere-hours capacity thereof falls off sharply when the batteries are discharged both at relatively high current densities at the electrodes and at cold temperatures. It is of course obvious that the current density may be kept low at the electrodes, so that the drop in capacity will not be appreciable at low temperatures, by increasing the number of electrodes to provide a greater active electrode surface in contact with the electrolyte. However, such an expedient is very expensive. By the present invention, the discharge capacity, under conditions of low temperature operation and high discharge rates causing relatively high current densities at the electrode surfaces, is improved very markedly simply by adding tin or compounds thereof to the battery. For example, let us consider an alkaline storage battery of the type mentioned which has a normal rating of 120 ampere hours at a normal temperature of 25° C., this rating being on the basis of a four-hour discharge at a normal rate of 30 amperes to an end voltage of 1.05 volts per cell. As a typical case, such a battery may have 500 milliliters of an aqueous alkaline solution, comprising for example 20% potassium hydroxide and 2% to 4% lithium hydroxide by weight, and may have a total quantity of 585 grams of active cadmium incorporated in the negative electrodes; also, such battery may have a current density at the negative electrodes of .75 ampere per square decimeter when the battery is discharged at its normal rate. If such a battery is discharged at a ten times normal rate of 300 amperes (7.5 amperes per square decimeter of electrode surface) and at normal temperature to an end voltage of .6 volt per cell, the discharge capacity falls to 100 ampere hours. Still further, if such a battery is discharged at a normal rate of 30 amperes to an end voltage of .6 volt per cell but at a temperature of only 0° F., the capacity falls to 80 ampere hours. Thus when such a battery is discharged at normal temperature but at ten times normal rate it will deliver about 84% of its normal capacity, and when the battery is discharged at normal rate but at 0° F. it will deliver about 66% of its normal capacity. However, if such a battery is discharged at both a high rate (300 amperes) and at a low temperature (0° F.) to an end voltage of .6 volt per cell, it will deliver only 12 ampere hours (10% of its normal capacity) on the first discharge and still less on subsequent discharges, and after several such discharges the battery will be well-nigh completely dead.

Upon adding a tin material to such a battery in accordance with the present invention, the operation of the battery at normal rates of discharge and at normal temperature remains substantially unchanged, but at a high rate of discharge (300 amperes) and at a low temperature (0° F.) the battery will deliver as much as 34 ampere hours—which is a nearly three times increase; moreover, upon the battery being recharged each time at normal temperature it will maintain this discharge capacity on each successive discharge under these adverse discharging conditions.

Broadly, my invention contemplates incorporating the tin material into the battery in an electrolytically-active state. I believe that the tin material can be incorporated most easily and that most effective results are obtained when it is added directly to the electrolyte. However, comparable results are obtained when the tin material is initially added to the negative electrode. Still alternatively, the tin material may be added initially to the positive electrode. In any case, metallic tin is eventually deposited on the negative electrode when the battery is charged. While the action of the tin material in improving the cell performance is not understood, it is believed that the presence of deposited metallic tin on the negative electrode and in effective contact with the electrolyte, and/or the presence of a soluble tin compound in the electrolyte solution capable of causing metallic tin to be deposited on the negative electrode when the battery is charged, are fundamental to the present invention.

A very satisfactory way of adding the tin material to the electrolyte is by anodic electrolysis which may for instance be carried out by connecting two separate containers of alkaline electrolyte, say potassium hydroxide, by means of an electrolyte bridge comprising a narrow, upright, U-shaped tube filled with the electrolyte, then placing an anode of tin in one container and a cathode of an electrochemically non-reactive material, say nickel, nickel-plated steel or stainless steel, in the other container, and passing a current between the two electrodes. Such current causes the tin to go into solution as stannates and/or stannites of potassium, but the tin does not readily pass through the tube to the other container and thus it remains in solution in one of the containers. An addition of 4 grams of tin to a battery having approximately 500 milliliters of an aqueous electrolyte solution comprising 20% potassium hydroxide and 2% to 4% lithium hydroxide by weight, and a total quantity of 585 grams of cadmium in the negative electrodes, and wherein the normal current density at the negative electrodes is of the order of .75 ampere per square decimeter, all as hereinbefore referred to in connection with the aforestated typical battery, has been found to give the nearly three times increase in capacity hereinbefore mentioned. Although the addition of this quantity of tin gives very beneficial results, this quantity is submitted only as an illustrative one and no unnecessary limitation thereto is intended.

A satisfactory way of adding a tin material to a negative cadmium electrode of the character hereinbefore described is as follows: The negative electrode is at least partially discharged so as to contain both cadmium and cadmium oxide, and is then washed in water to remove residual alkali and next dried to leave the pores open. This electrode is then immersed for one hour at a temperature of 20° to 30° C. in a stannous chloride solution comprising 2 grams of stannous chloride ($SnCl_2 \cdot 2H_2O$) dissolved in 1400 milliliters of water, there being added a small quantity of hydrochloric acid if necessary to clear the solution. During this immersion, tin is deposited onto the cadmium because the cadmium is the higher of the two in the electromotive force series. Only by way of illustration, when one gram of tin is incorporated in this way into the aforestated typical battery referred to in the foregoing paragraph, the battery will have a capacity of 24 ampere hours when discharged at 300 amperes and at 0° F. Thus, by adding one-fourth as much tin as was incorporated in the foregoing illustrative example, there is obtained a two times increase in capacity at ten times normal discharge rate at low temperature.

If the tin is added initially to the positive electrode, as by mechanically incorporating finely-divided tin or the oxides or hydroxides thereof into a porous conducting support, or as when pocketed or tubular conducting supports are used by mixing the tin with the nickel oxide or hydroxide and mechanically injecting the mixture into such supports, the tin goes into solution by anodic electrolysis when the battery is charged, forming stannate and/or stannite of potassium and lithium, and is deposited onto the cadmium electrode. Thus, in the final stage, the tin appears in the battery as a soluble compound in the electrolyte and/or as deposited metallic tin on the negative electrode, regardless of how it is initially introduced into the battery, to perform its beneficial action as described.

Suitable tin compounds may be added directly to the electrolyte provided they are fairly soluble therein to cause deposition of tin on the cadmium electrode when the battery is charged, and provided that they do not include foreign materials which are themselves detrimental to the action of the battery. Of such compounds, the stannate and/or stannite of potassium and of lithium are preferred, as described, but tin oxide and tin hydroxide are also efficacious.

In the alkaline storage battery field it has been the best practice from a cost and functional standpoint to use alkaline elcetrolytes composed principally of potassium hydroxide with a minor proportion of lithium hydroxide, and it is because of this practice that I have herein particularly described my invention in connection with these hydroxides. However, although my invention has particularly beneficial results in connection with these hydroxides, and is preferably used with such hydroxides, it is not necessarily limited thereto but will have beneficiial results with other alkaline electrolytes, say electrolytes composed principally of sodium hydroxide; accordingly, it will be understood that I intend no unnecessary limitation of my invention in connection with any particular hydroxide or to compounds of tin with that hydroxide.

The expressions "cadmium material" and "nickel material" as used in the claims are intended to include the respective metals and the respective oxides and hydroxides thereof. The term "stannate and/or stannite" as herein used is meant to encompass the soluble forms of tin in alkaline solution.

I claim:

1. An alkaline battery comprising a positive electrode, a negative electrode including active cadmium material, an alkaline electrolyte and a tin material in effective contact with said electrolyte and in a form capable of depositing onto the negative electrode when the battery is charged.

2. An alkaline battery comprising a positive electrode, a negative electrode including active cadmium material, an alkaline electrolyte and metallic tin deposited on said negative electrode.

3. An alkaline battery comprising a positive electrode, a negative electrode including active cadmium material, an alkaline electrolyte and a soluble tin compound in said electrolyte.

4. In a battery having a positive electrode including oxide of nickel or cobalt as the active material: the combination of a negative electrode including finely-divided electrolytically - active cadmium material, an alkaline electrolyte material, and electrolytically-active tin included in at least one of said materials.

5. In a storage battery having a positive electrode including oxide of a metal capable of furnishing depolarizing oxygen to the battery during discharge thereof: the combination of a solution of an alkaline electrolyte material, a negative electrode including a conducting support and an active material comprising electrolytically-active cadmium when charged, and electrolytically-active tin in at least one of the aforestated materials.

6. A negative electrode for an alkaline electrolyte storage battery, comprising a conducting support, and an active material comprising cadmium and tin on said support, said material being capable of being oxidized on discharging.

7. The electrode set forth in claim 6 wherein, by weight, 1 to 4 parts of tin are present in said electrode to 585 parts of cadmium.

8. An alkaline battery comprising a positive electrode including nickel oxide, an alkaline electrolyte, and a negative electrode including active cadmium material and one or more elements selected from the group consisting of tin, tin oxide and tin hydroxide.

9. A negative electrode for an alkaline storage battery, comprising a sintered porous conducting support having therein finely-divided electrolytically-active cadmium material and having tin deposited thereon in an amount of the order at most of 1% by weight of the active cadmium material in said electrode.

10. In a storage battery: the combination of electrodes including nickel and cadmium materials, and an alkaline electrolyte solution comprising approximately 20% potassium hydroxide and 2% to 4% lithium hydroxide by weight, including a solution of metallic tin in caustic alkali in an amount of the order of 4 grams of tin per 500 milliliters of said electrolyte solution.

11. A battery having a positive electrode including nickel oxide, a negative electrode including cadmium, and an electrolyte comprising potassium and lithium hydroxides and a solution of metallic tin in said hydroxides.

JOSEPH DONALD MOULTON.

REFERENCES CITED

The following references are of record in the file of this patent:

UNITED STATES PATENTS

| Number | Name | Date |
| --- | --- | --- |
| 402,006 | Desmazures | Apr. 23, 1889 |
| 1,088,343 | Hubbell | Feb. 24, 1914 |
| 1,475,503 | Meyer et al. | Nov. 27, 1923 |
| 2,213,128 | Langguth | Aug. 27, 1940 |
| 2,313,371 | Stack | Mar. 9, 1943 |

OTHER REFERENCES

Crennell et al.: Alkaline Accumulators (1928), pages 105, 106.